United States Patent [19]
Becker et al.

[11] 3,786,707
[45] Jan. 22, 1974

[54] APPARATUS FOR CUTTING OFF SUCCESSIVE PORTIONS FROM A STRAND OF PLASTIC MATERIAL SUCH AS A STRAND OF VISCOUS GLASS

[75] Inventors: Kurt Becker, Obernkirchen; Hans-Georg Seidel, Rinteln, both of Germany

[73] Assignee: Hermann Heye, Allee, Obernkirchen, Germany

[22] Filed: May 19, 1972

[21] Appl. No.: 255,033

[30] Foreign Application Priority Data
May 29, 1971 Germany..................2126825

[52] U.S. Cl..................... 83/299, 83/311, 83/328, 83/344
[51] Int. Cl............................................. B26d 1/40
[58] Field of Search...... 83/328, 327, 299, 311, 344

[56] References Cited
UNITED STATES PATENTS

| | | |
|---|---|---|
| 2,704,577 | 3/1955 | Haldeman............................ 83/328 |
| 3,251,265 | 5/1966 | Cvacho et al..................... 83/328 X |
| 3,293,970 | 12/1966 | Brockmuller.......................... 83/328 |
| 3,324,752 | 6/1967 | Brockmuller.......................... 83/328 |
| 3,466,961 | 9/1969 | Konovalov et al................ 83/328 X |

Primary Examiner—Frank T. Yost
Attorney, Agent, or Firm—Michael S. Striker

[57] ABSTRACT

Apparatus for cutting off portions from a strand of plastic material advancing in axial direction in which a pair of opposite substantially parallel cutting knives are arranged to opposite sides of the strand movable in the direction of the strand axis and toward and away from each other in a direction transverse to the axis of the strand to thereby cut the latter. The knives are respectively supported on two shafts which in turn are turnably supported at opposite ends in two pairs of carrier discs and means are provided to rotate the two pairs of carrier discs about their axes while preventing rotation of said shafts about the axes of the latter so as to maintain the knives parallel to each other during their movement.

10 Claims, 8 Drawing Figures

APPARATUS FOR CUTTING OFF SUCCESSIVE PORTIONS FROM A STRAND OF PLASTIC MATERIAL SUCH AS A STRAND OF VISCOUS GLASS

BACKGROUND OF THE INVENTION

The present invention relates to an apparatus for cutting off successive portions from a strand of plastic material, for instance a strand of viscous glass, in which the cutting off operation of successive portions of the advancing strand is carried out by a pair of knives which are movable transverse to as well as in the direction of the strand axis. Such apparatus may for instance be used for cutting successive portions off a strand of viscous glass so that successive cutoff portions may be fed into molds of a bottle making machine or the like.

Apparatus of the aforementioned kind are known in the art and for instance the U.S. Pat. No. 2,090,082 discloses an apparatus in which each cutting knife of a cooperating pair of knives is linked to four levers which are parallel to each other and which are mounted in a telescoping part and pretensioned by springs to an upper normal position. The two telescopic parts are selectively movable transverse to each other by a cylinder and a control gearing. The movement of the knives in direction of the longitudinal axis of the strand is obtained by stationary stops cooperating with additional tilting arms of the levers. At the end of the cutting operation the angular position of the cutting knives is maintained by a locking device until the telescoping parts are moved away from each other for a sufficient distance to avoid a collision of the knives with the glass strand. Subsequently thereto the locking device releases the knives and the latter turn in the opposite direction back to their normal position. The construction of this known apparatus is, due to its many movable parts, complicated and, therefore, liable to malfunction. In addition, the turning of the cutting knives to their normal position takes a relatively long time so that cuts cannot be carried out in quick succession.

In another known apparatus (U. S. Pat. No. 2,090,082), each knife is linked to two pairs of crank arms extending parallel to each other and non-uniformly driven by elliptical wheels so that each knife moves along a circular path in a vertical plane while being continuously held in horizontal position. This contruction is likewise due to the many movable parts it contains, very complicated and liable to malfunction.

In another known apparatus (U.S. Pat. No. 1,362,785), each knife is reciprocated by a crank drive in a horizontal guide which in turn is reciprocable in vertical direction by means of an eccentric drive. This known apparatus is however, due to the large masses which have to be oscillated with the knives, very slow in operation.

SUMMARY OF THE INVENTION

It is an object of the present invention to provide an apparatus of the aforementioned kind which avoids the above-mentioned disadvantages of such apparatus known in the art.

It is a further object of the present invention to provide for an apparatus of the aforementioned kind which is composed of relative few and simple parts so that the apparatus may not only be produced at very reasonable cost and stand up perfectly under extended use, but so that the apparatus can also be operated at higher speeds to produce a quicker succession of cuts than the apparatus known in the art.

With these and other objects in view, which will become apparent later on, the apparatus according to the present invention for cutting off successive portions from at least one strand of plastic material, such as a strand of viscous glass, advancing in axial direction, mainly comprises a pair of opposite substantially parallel cutting knives extending in a direction transverse to said axial direction, means supporting the knives movable toward and away from each other in said transverse direction and in said axial direction and comprising a pair of parallel shafts respectively supporting the knives in the region of the ends of the latter facing away from each other and two pairs of carrier discs, one pair for each shaft with the discs in each pair aligned along a common axis, and turnably supporting the respective shaft on opposite ends thereof extending parallel to and radially outwardly from the axis of the respective pair of carrier discs, and drive means cooperating with said pairs of carrier discs and said shafts for rotating said pairs of carrier discs about their axes while preventing rotation of the shafts about the axes of the latter so as to move the knives in said transverse and axial directions while maintaining the knives parallel to each other and extending in said transverse direction.

The apparatus includes preferably two first gears respectively coaxially fixed to the shafts, two second gears respectively coaxially arranged with the two pairs of carrier discs and meshing respectively with the two first gears, whereas the drive means may comprise gear means rotating said two second gears and the two pairs of carrier discs respectively in opposite direction and with the same angular velocity.

According to a further development, the drive means may comprise a planetary gearing including a sun gear, an outer annular gear, coaxially surrounding the sun gear, and being turnable about the axis of the latter, a pair of planetary gears arranged between the sun gear and the outer gear in mesh therewith, means mounting the planetary gears for rotation about their axes and about the axis of the sun gear, a drive shaft fixed to the mounting means and arranged coaxially with the sun gear, a pinion fixed to the drive shaft, first gear means meshing with the pinion and driving one of the second gears and one of the pairs of carrier discs coaxial with said one second gear, a reversing gear meshing with said pinion, and second gear means meshing with the reversing gear and driving the other of said second gears and the pair of carrier discs coaxial with the other of said second gears. The drive means preferably include also a main drive motor driving the sun gear, an auxiliary drive motor, a first crank pin radially spaced from the axis of the shaft of the auxiliary drive motor and connected to the shaft for rotation about the axis of the latter, a second crank pin radially spaced from the axis of the outer annular gear and connected to the latter for movement therewith, and a connecting rod pivotally mounted on opposite ends on the first and the second crank pin. With this arrangement it is possible to superimpose to the rotating movement produced by the main motor other angular movements so as to obtain the best possible cutting movements of the knives. The arrangement preferably includes also means for adjusting the radial distance of at least one of the crank pins from the respective axis and means for adjusting the length of the connecting rod.

By arranging on each pair of carrier discs a plurality of knife supporting shafts, whereby the same number of shafts angularly spaced through the same angles must be provided on each pair of carrier discs, it is possible to obtain an increased number of portions cut off from the strand per time unit without increase of the angular velocity of the carrier discs. Inasmuch as the cutting operating performed by each knife requires a minimum time, whereas also another minimum time is necessary to withdraw each of the cutting knives to its starting position, only a limited number of cuts may be carried out per time unit with each pair of cutting knives. The succession of cuts produced by the apparatus can, however, be increased with the last-mentioned arrangement in which, while one pair of cutting knives performs the cutting operation, the other pair of pairs mounted on the other shafts of the two pairs of carrier discs move back to the starting or retracted position or advance from the starting position to be ready for the next cutting operation.

If two or a plurality of strands of viscous glass are advanced at the same time, for instance, for supplying multiple molds, it is also possible to arrange on each shaft two or more cutting knives spaced in the direction of the shaft axis from each other.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawings.

Figure 1:
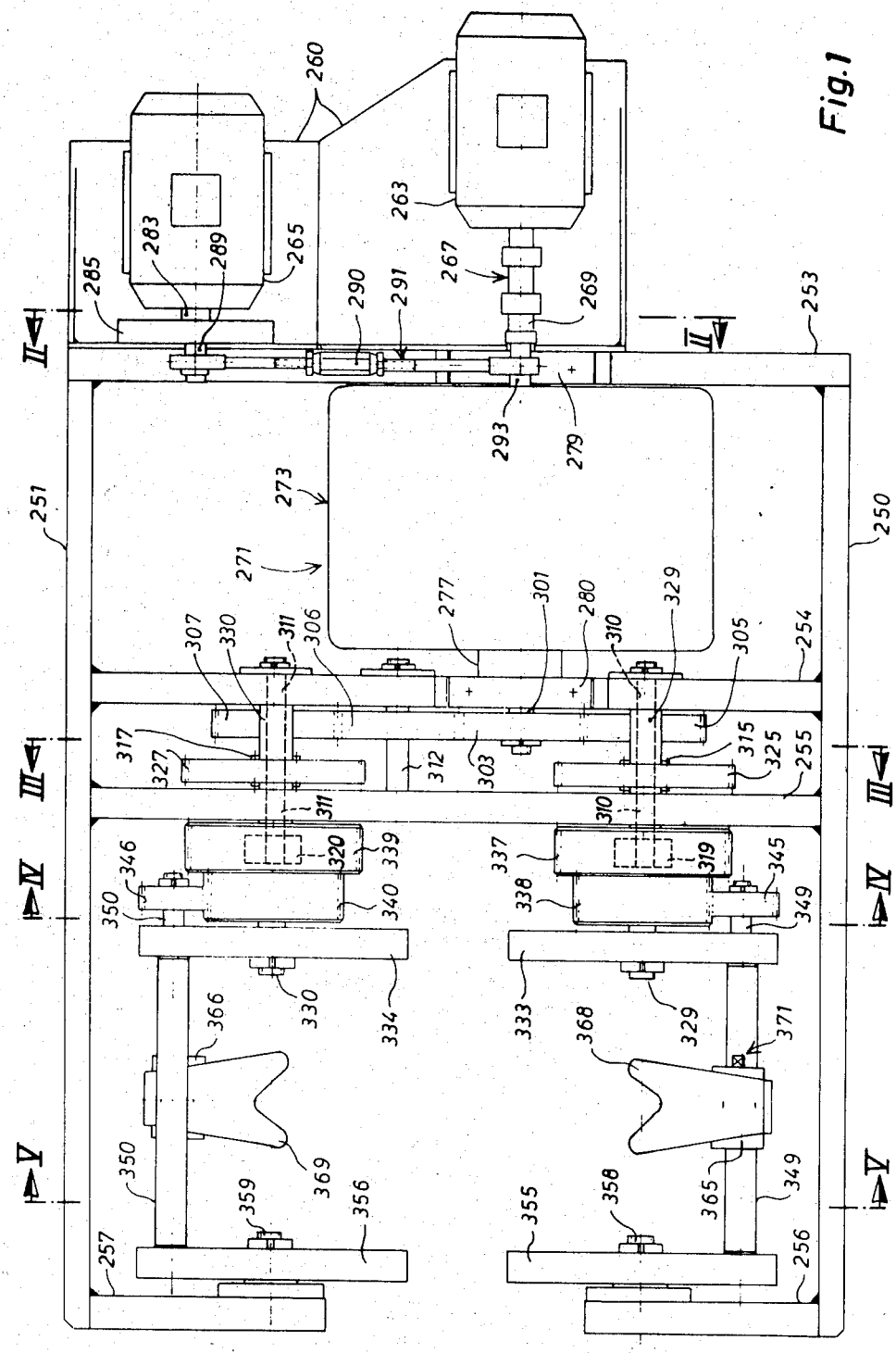
FIG. 1 is a top view of the apparatus according to the present invention.

DESCRIPTION OF THE PREFERRED EMBODIMENTS:

Referring now to the drawing, and more specifically to FIG. 1 of the same, it will be seen that the apparatus of the present invention has a frame comprising two vertically extending longitudinally walls 250 and 251 and transverse walls 253–257 which are welded to the longitudinal walls. A base plate 260 is fixed in any convenient manner to the transverse wall 253, projecting laterally therefrom on which a drive motor 263 and an auxiliary drive motor 265 are mounted.

The main drive motor 263 is connected by means of a coupling 267 to a shaft 269 on which a sun gear 270 (FIG. 2) of a planetary gearing 271 is mounted. A gear case 273 of the planetary gearing 271 which carries in its interior an outer gear ring 275 of the planetary gearing 271, is turnably mounted on opposite ends thereof by means of a hollow shaft 277 for which bearings 279 and 280 are respectively provided in the transverse walls 253 and 254.

A circular disc 285 is coaxially fixed to the drive shaft 283 of the auxiliary motor 265 and the disc carries a crank pin 289 axially projecting therefrom. The radial distance of the pin 289 from the axis of the shaft 283 may be adjusted by a known adjusting device 287, schematically indicated in FIG. 2. A connecting rod 291, the length of which may be adjusted by a turn buckle 290, is pivotally connected at one end to the crank pin 289, whereas the other end of the connecting rod 291 is pivotally connected to another pin 293 projecting in axial direction from an end wall of the gear case 273 radially spaced from the axis of the latter.

The main drive motor 263 and the auxiliary drive motor 265 will run, during operation of the apparatus, continuously and synchronously with respect to each other, that is, with an equal number of revolutions or a fixed ratio of revolutions. Due to the drive of the auxiliary motor 265, the gear case 273 will carry out an oscillatory angular movement, the turning angle of which will depend on the radial distance of the crank pin 289 from the axis of the shaft 283.

Figure 2:
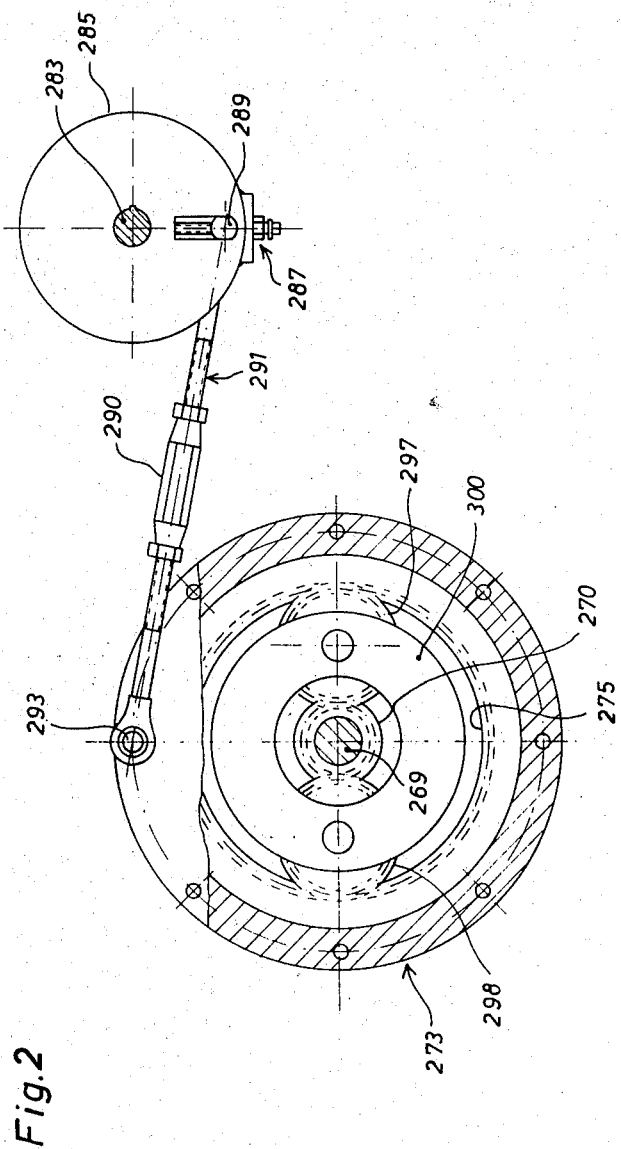
FIG. 2 is a cross-section taken along the line II—II of FIG. 1.
Figure 4:
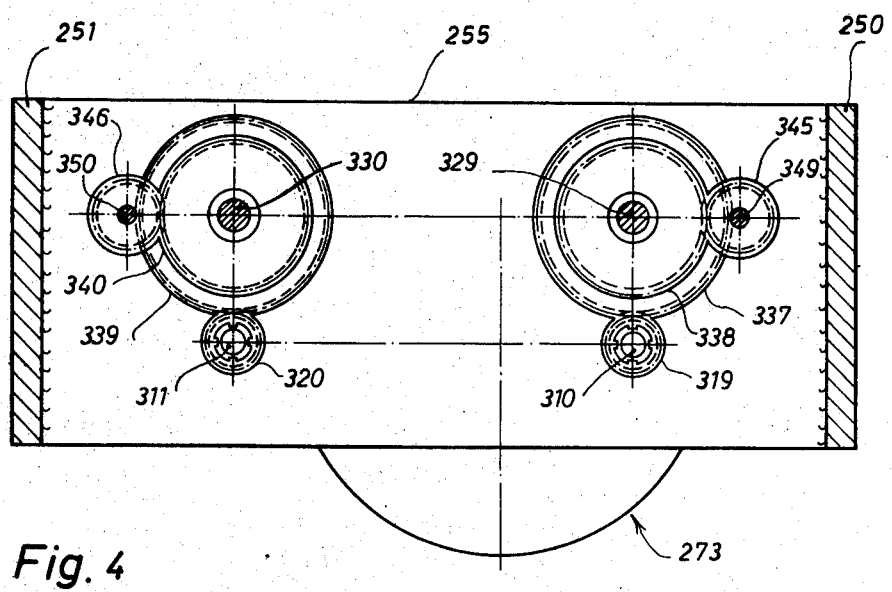
FIG. 4 is a cross-section taken along the line IV—IV of FIG. 1.

As shown in FIG. 2, two planet gears 297 and 298 are arranged opposite each other between the sun gear 270 and the outer annular gear 275 in mesh with the sun gear and the outer gear. Mounting means in form of an annular bridge 300 support the two planet gears 297 and 298 for rotation about their axes and about the axis of the sun gear 270. As shown in FIG. 1, the annular bridge 300 is provided with a drive shaft 301 coaxial with the axis of the gear case 273 and extending through the hollow shaft 277 and the transverse wall 254 and carrying coaxially fixed thereto a pinion 303. The pinion 303 meshes at one side with a gear 305 and at the other side with reversing gear 306, which in turn meshes with a further gear 307. The axes of the four gears 303–307 are arranged in a horizontal plane and each of the four gears has the same diameter so that the ratio of transmission between the gears is 1:1. The shafts 310, 311 and 312 (FIG. 3) of the gears 305 and 307 as well as the reversing gear 306 are turnably mounted in the transverse walls 254 and 255. The shafts 310 and 311 are respectively provided between the transverse walls 254 and 255 with a pinion 315 and 317 coaxially fixed thereto, and the shafts extend through the transverse wall 255 and respectively carry on the portions projecting beyond the transverse wall 255 an additional pinion 319 and 320, as shown in FIG. 4. The pinions 315 and 317 respectively mesh with gears 325 and 327 which are respectively fixed to shafts 329 and 330 which are turnably mounted in the transverse walls 254 and 255. The shafts 329 and 330 are, as shown in FIG. 1, extended toward the left beyond the transverse wall 255 and respectively carry in the regions of the free ends thereof a carrier disc 333 and 334 fixedly connected thereto. The shafts 329 and 330 respectively carry between the transverse wall 255 and the carrier discs 333 and 334, two coaxial fixedly connected gears 337, 338 respectively 339 and 340 which are arranged freely turnable on the shafts 329 and 330. The gears 337 and 339 are respectively driven by the pinions 319 and 320, as shown in FIG. 4, and they drive in turn the gears 338 and 340 respectively meshing with the gears 345 and 346 which are respectively coaxially fixed to the shafts 349 and 350.

Two additional carrier discs 355 and 356 of the same diameter as the carrier discs 333 and 334 are turnably mounted on stub shafts 358 and 359 fixed in any convenient manner to the transverse walls 256 and 257 coaxially arranged and axially spaced from the carrier discs 333 and 334. The pairs of carrier discs 333, 355 and 334, 356 are respectively connected to each other for simultaneous rotation by shafts 349 and 350 extending parallel to the axes of the pairs of carrier discs radially displaced therefrom and being respectively turnably mounted at opposite ends in corresponding bores of the carrier discs. The shafts 349 and 350 will therefore carry out the same angular movement as the carrier discs 333 and 334.

Figure 5:
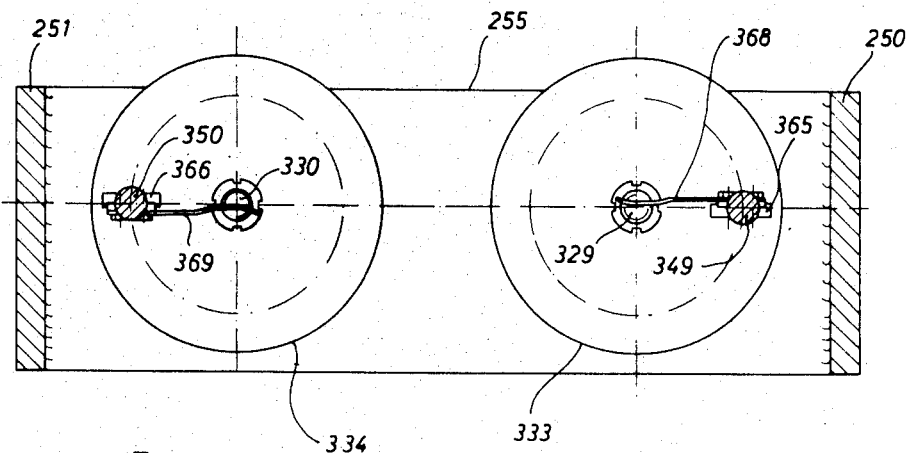
FIG. 5 is a cross-section taken along the line V—V of FIG. 1.

The shafts 349 and 350 respectively carry knife carriers 365 and 366 on which, as shown in FIG. 5, an upper knife 368 and a lower knife 369 are respectively mounted projecting in substantially horizontal direction from the respective knife carrier toward each other. Whereas the lower knife 369 is not adjustable in vertical direction, the upper knife 268 may be adjustable in vertical direction, that is normal to the plane of the drawing as viewed in FIG. 1, by means of an adjusting device 371 provided with wedges, not shown in the drawing, relative to the lower knife 369.

Figure 7:
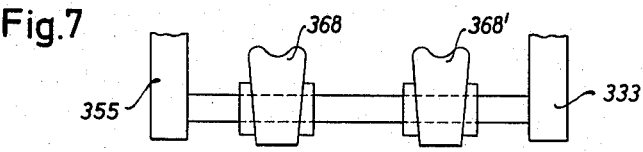
FIG. 7 is a partial top view of a modified apparatus illustrating a plurality of cutting knives on each shaft.

If it is desired to cut off successive portions from two or more parallel strands of plastic material, such as viscous glass, for instance for feeding gobs of molten glass into multiple mold forms of a bottle making machine or the like, then two or a pluality of knives may be mounted on each of the shafts 349 and 350 axially displaced from each other so that always two oppositely arranged knives will form a pair of cooperating knives in the manner as constituted by the knives 368 and 369. An arrangement in which at least two knives 368 and 368' are arranged on one shaft is partly shown in FIG. 7 and it is to be understood that the other shaft likewise carries two knives opposite the knives shown.

Due to the specific mounting and drive of the pairs of carrier discs 333, 355 and 334, 356 and the shafts 349 and 350 turnably mounted thereon the knives 368 and 369 will always remain in the horizontal position, as shown in FIG. 5, since the shafts 349 and 350 will not turn about their axes during turning of the pairs of carrier discs 333, 355 and 334, 356.

Figure 3:
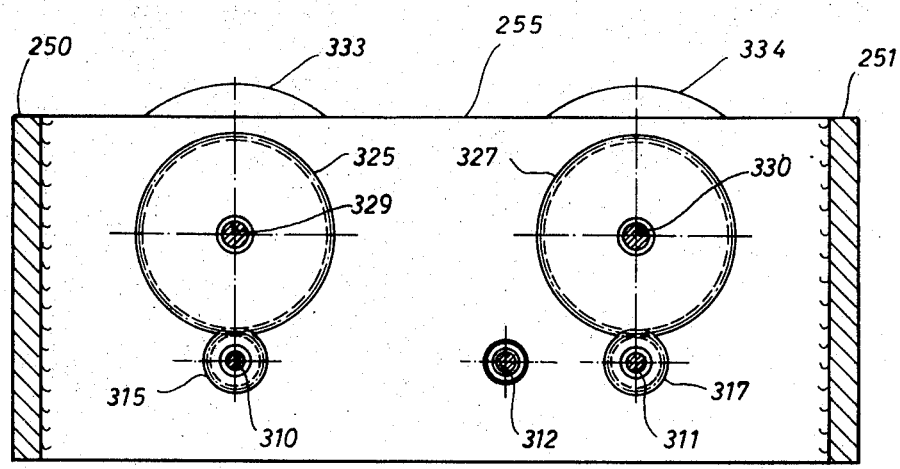
FIG. 3 is a cross-section taken along the line III—III of FIG. 1.

FIG. 3 illustrates how the pinions 315 and 317 respectively mesh with the gears 325 and 327.

Figure 6:
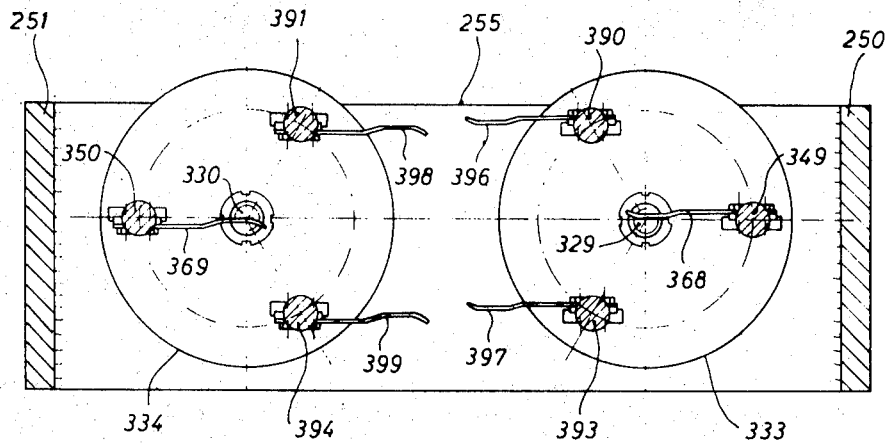
FIG. 6 is a cross-section similar to FIG. 5 and showing a plurality of pairs of cutting knives.

FIG. 6 illustrates part of a modified arrangement in which the pair of carrier discs 333, 354 and 334, 356 carry besides the two shafts 349 and 350 two additional pairs of shafts 390, 391 and 393, 394 turnable about their axes and arranged angularly spaced from each other through the same angle. The shafts 390 and 393 respectively carry an additional upper knife 396 and 397, whereas the shafts 391 and 394 respectively carry an additional lower knife 398 and 399. The shafts 390-394 also project through the carrier disc 333 and 334 and have gears fixed thereon which mesh with the gears 338 and 340 in the same manner as the gears 345 and 346. All six knives shown in FIG. 6 move in a vertical plane. Evidently it is also possible to arrange a plurality of knives on each shaft as described above in connection with FIG. 7 if a multiple mold should be fed with gobs of glass.

With the arrangement as shown in FIG. 6 it is necessary that the ratio of revolutions performed by the main drive motor 263 and the auxiliary drive motor 265 is 1:3 so that while the carrier dics turn through a third of a full revolution, the auxiliary drive motor 265 will make a full revolution.

While FIG. 6 illustrates three pairs of shafts between each pair of carrier discs it is evident that a different number of pairs of shafts, for instance two or four pairs of shafts may be provided for each pair of carrier discs.

Figure 8:
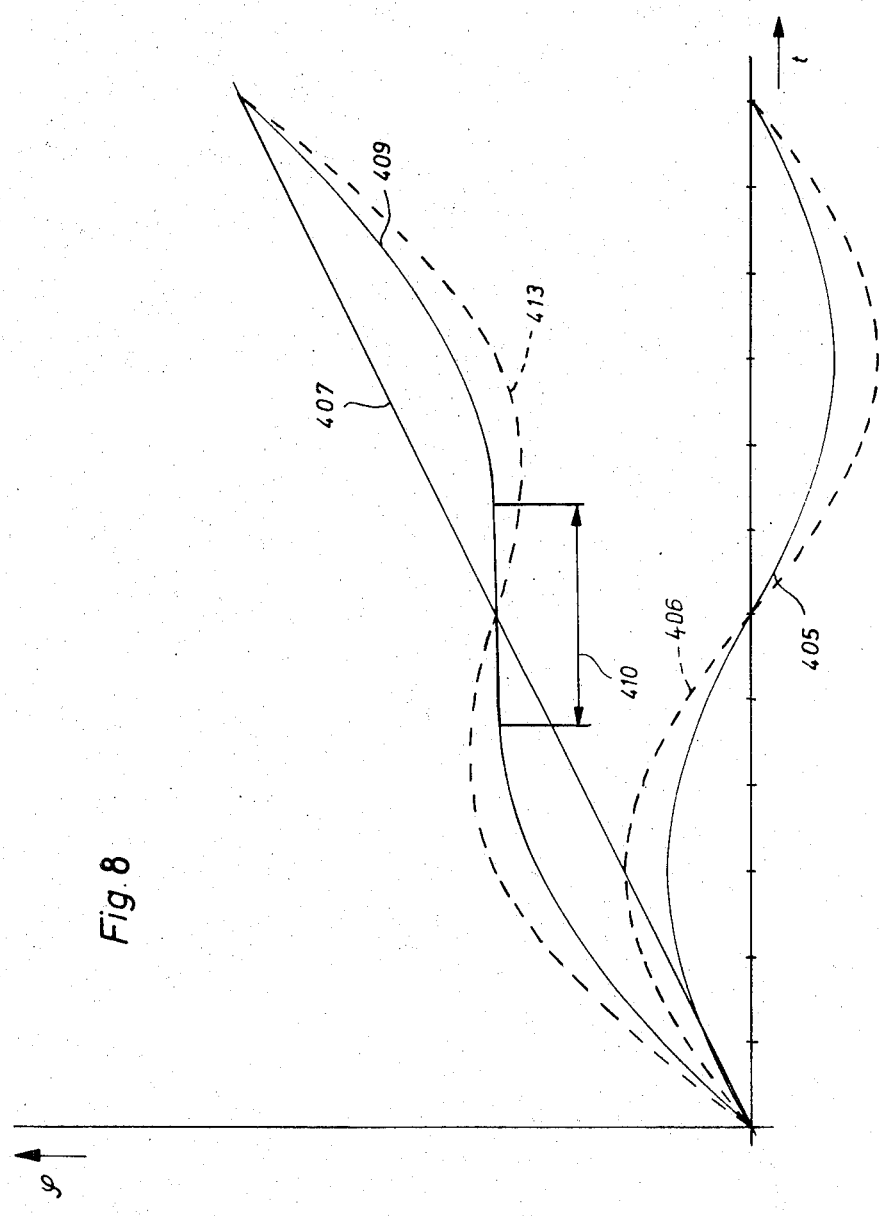
FIG. 8 is a schematic diagram illustrating the movement of the drive shaft of the drive means according to FIG. 1.

In the diagram of FIG. 8 the operating time of the drive shaft 301 is plotted on the abscissa and the angle of rotation of the drive shaft is plotted on the ordinate. If only the auxiliary motor 265 would be in operation, then the drive shaft 301 would follow during each cutoff cycle the sinus curve 405 as shown in FIG. 8. If however, only the main drive motor would be operated, then the movement of the drive shaft 301 would correspond to the straight line 407. However, since the main drive motor 263 as well as the auxiliary motor 265 are simultaneously and continuously operated, there will result, by superimposition of the sinus curve 405 and the straight line 407, the curve 409 which has a middle portion 410 extending parallel to the abscissa. The length of the portion 410 indicates the time the drive shaft 301 is at standstill. The length of this standstill period in relation to the cutoff cycle may be adjusted, as will be explained later on. This provides for the possibility to adjust the actual cutting operation in accordance with the cycle of the machine in which the cutoff strand portions are used and in accordance with the axial advance of the strand, for instance the speed at which a strand of viscous glass leaves a feeder spout. The timing of the standstill periods relative to the angular position of the carrier disc pairs 333, 355 and 334, 356 may be freely selected as long as knives 368, 369, respectively the knives 368, 369, 396-399 are out of engagement with the strands to be cut off. For instance the standstill periods may start when the shafts, for instance the shafts 349 and 350 are located in the upper dead center position or downstream of the dead center position as considered in the drection of turning of the carrier discs. In such a position of the shafts, for instance the shafts 349 and 350, it is not necessary to accelerate the shafts and the knives mounted thereon in opposition to gravity forces.

When the motors 263 and 265 are respectively driven with constant speeds, it is possible to change the curve 405 by changing the radial position of the crank pin 289 as described in connection with FIG. 2. In this way the curve 406 shown in dotted lines is produced by the action of the auxiliary motor 265. In this way a resulting curve 413 will be obtained as likewise indicated in dotted lines in FIG. 8. The curve 413 shows at its middle region a portion with negative inclination which indicates not only a standstill of the drive shaft 301 but a transitory reverse of its direction of rotation. With the curve 413 there will result in the portions of positive inclination greater angular velocities than in the curve 409.

It will be understood that each of the elements described above, or two or more together, may also find a useful application in other types of apparatus for cutting off successive portions from at least one strand of plastic material differing from the types described above.

While the invention has been illustrated and described as embodied in an apparatus for cutting off successive portions from at least one strand of plastic material by a pair of opposite cooperating knives, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

1. Apparatus for cutting off successive portions from at least one strand of plastic material, such as a strand of viscous glass, advancing in axial direction, said apparatus comprising a pair of opposite substantially parallel cutting knives extending in a direction transverse to said axial direction; means supporting said knives movable toward and away from each other in said transverse direction and in said axial direction and comprising a pair of parallel shafts respectively supporting said knives and at least one pair of carrier discs, one for each shaft, arranged turnable about parallel axes and turnably supporting the respective shaft extending parallel to and radially outwardly from the axis of the respective carrier disc; and drive means cooperating with said carrier discs and said shafts for rotating said carrier discs about their axes while preventing rotation of said shaft about the axes of the latter so as to move said knives in said transverse and axial directions while maintaining the same parallel to each and extending in said transverse direction, said drive means comprising a drive shaft, gear trains between said drive shaft, said carrier discs and said shafts, a main drive motor, planetary gearing means between said main drive motor and said drive shaft for driving the latter with a constant angular speed, an auxiliary motor, and means connected to said auxiliary motor and said planetary gearing means and cooperating with the latter to superimpose to the constant angular speed produced by said main motor additional rotary movements to said drive shaft.

2. Apparatus for cutting off successive portions from at least one strand of plastic material, such as a strand of viscous glass, advancing in axial direction, said apparatus comprising a pair of opposite substantially parallel cutting knives extending in direction transverse to said axial direction; means supporting said knives movable toward and away from each other in said transverse direction and in said axial direction and comprising a pair of parallel shafts respectively supporting said knives, at least two carrier discs, one for each shaft, arranged turnable about parallel axes and turnably supporting the respective shaft extending parallel to and radially outwardly from the axis of the respective carrier disc; two first gears respectively coaxially fixed to said shafts; two second gears respectively coaxially arranged with said carrier discs and respectively meshing with said pair of first gears; and drive means cooperating with said carrier discs and said shafts for rotating said carrier discs about their axes and preventing rotation of said shafts about the axes of the latter so as to move said knives in said transverse and axial directions while maintaining the same parallel to each other and extending in said transverse direction, said drive means comprising a planetary gearing including a sun gear, an outer annular gear coaxially surrounding said sun gear and turnable about the axis of the latter, a pair of planet gears arranged between said sun gear and said outer gear enmeshed therewith, means mounting said planet gears for rotation about their axes and about the axis of said sun gear, a drive shaft fixed to said mounting means and arranged coaxially with said sun gear, a pinion fixed to said drive shaft, first gear means meshing with said pinion and driving one of said second gears and the carrier disc coaxial with said second gear, a reversing gear meshing with said pinion, and second gear meshing with said reversing gear and driving the other of said second gears and the carrier disc coaxial with said other of said second gears.

3. Apparatus as defined in claim 12, wherein said means for supporting said knives comprise two pairs of spaced coaxial carrier discs, one pair for each shaft, with the discs in each pair aligned along a common axis and turnably supporting the respective shaft on opposite ends thereof extending parallel to and radially outwardly from the axis of the respective pair of carrier discs.

4. Apparatus as defined in claim 2, and including a main drive motor driving said sun gear, an auxiliary drive motor having a shaft, a first crank pin radially spaced from the axis of said shaft of said auxiliary drive motor and connected to said shaft for rotation about the axis of the latter, a second crank pin radially spaced from the axis of the outer annular gear and connected to the latter for movement therewith, and a connecting rod pivotally mounted on opposite ends on said first and said second crank pin.

5. Apparatus as defined in claim 4 and including means for adjusting the radial distance of at least one of said crank pins from the respective axis.

6. Apparatus as defined in claim 4, and including means for adjusting the length of said connecting rod.

7. Apparatus as defined in claim 4, wherein said planetary gearing comprises a gear case having an axis coaxial with that of said sun gear and being mounted turnably about said axis, said outer annular gear being located within said gear case and fixed thereto, said gear case having an end wall from which said second crank pin projects in axial direction.

8. Apparatus as defined in claim 3, wherein each pair of carrier discs carries a plurality of shafts angularly displaced from each other and each supporting at least one knife, the number of shafts and their angular displacement from each other being the same for each pair of carrier discs.

9. Apparatus as defined in claim 8, wherein said plurality of shafts on each pair of carrier discs are displaced through equal angles from each other.

10. Apparatus as defined in claim 3, wherein each shaft carries a plurality of knives spaced from each other along the shaft axis.

* * * * *